United States Patent
Nam et al.

(10) Patent No.: US 12,236,013 B2
(45) Date of Patent: Feb. 25, 2025

(54) MOBILITY DEVICE AND METHOD FOR CONTROLLING THE SAME

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Seung Kyu Nam, Seoul (KR); Il Yong Yoon, Seoul (KR); Tae Jun Lee, Suwon-si (KR); Chang Hwan Im, Seoul (KR); Jin Uk Kwon, Seoul (KR); Hye Rin Nam, Seoul (KR); Ji Hun Hwang, Seoul (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 205 days.

(21) Appl. No.: 17/988,154

(22) Filed: Nov. 16, 2022

(65) Prior Publication Data
US 2023/0333652 A1 Oct. 19, 2023

(30) Foreign Application Priority Data
Apr. 18, 2022 (KR) .......................... 10-2022-0047653

(51) Int. Cl.
*G06F 3/01* (2006.01)
*H04N 9/31* (2006.01)

(52) U.S. Cl.
CPC ........... *G06F 3/015* (2013.01); *H04N 9/3182* (2013.01); *H04N 9/3194* (2013.01)

(58) Field of Classification Search
CPC ..... G06F 3/015; H04N 9/3182; H04N 9/3194
See application file for complete search history.

(56) References Cited

U.S. PATENT DOCUMENTS 11,402,908 B2    8/2022  Kang et al.
2014/0051961 A1*  2/2014  Badower ................ A61B 5/369
                                                        600/383
(Continued)

FOREIGN PATENT DOCUMENTS

CN    102973371 B      1/2015
CN    106681494 A  *   5/2017
(Continued)

OTHER PUBLICATIONS

Machine Translation of CN-210631403-U (Year: 2020).*
(Continued)

*Primary Examiner* — Hussein Elchanti
*Assistant Examiner* — Kenneth M Dunne
(74) *Attorney, Agent, or Firm* — Banner & Witcoff, Ltd.

(57) ABSTRACT

A mobility device may include a drive for driving the mobility device, a projector for outputting a visual stimulus, an electroencephalogram device for detecting a brainwave of a user, and a controller for controlling the drive and/or the projector. The controller may be connected to the EEG device, and may be configured to control the projector to output the visual stimulus to a surface at a position spaced by a specified distance from the mobility device.

19 Claims, 7 Drawing Sheets

(56) References Cited

U.S. PATENT DOCUMENTS

| | | | | |
|---|---|---|---|---|
| 2014/0347265 A1* | 11/2014 | Aimone | ............... | H04W 4/30 345/156 |
| 2015/0309572 A1* | 10/2015 | Shi | ..................... | G06F 3/015 706/11 |
| 2016/0370774 A1 | 12/2016 | Lamti et al. | | |
| 2018/0024640 A1* | 1/2018 | Yeom | ................. | B60K 35/28 180/218 |
| 2019/0104968 A1 | 4/2019 | Fedele | | |
| 2021/0117000 A1 | 4/2021 | Kang et al. | | |

FOREIGN PATENT DOCUMENTS

| | | | | | |
|---|---|---|---|---|---|
| CN | 106821628 | B | | 10/2018 | |
| CN | 210631403 | U | * | 5/2020 | |
| CN | 107961120 | B | * | 6/2020 | ........... A61B 5/0476 |
| KR | 10-1400141 | B1 | | 5/2014 | |
| KR | 101465878 | B1 | | 11/2014 | |
| KR | 10-2021-0046236 | A | | 4/2021 | |
| WO | 2019-0073603 | A1 | | 4/2019 | |

OTHER PUBLICATIONS

Iturrate et al, "A Noninvasive Brain-Actuated Wheelchair Based on a P300 Neurophysiological Protocol and Automated Navigation", 2009, IEEE (Year: 2009).*

Pallab Dutta et al, "A Novel Approach to Power Optimization for Projection Systems", 2017, Indian Journal of Science and Technology (Year: 2017).*

Son et al, "Color Correction of Images Projected on a Colored Screen for Mobile Beam Projector", 2008, Journal of Imaging Science and Technology (Year: 2008).*

Watanabe et al, "Communicating Robotic Navigational Intentions", 2015, IEEE (Year: 2015).*

Huang et al, "Electroencephalography (EEG)-Based Brain-Computer Interface (BCI): a 2-D Virtual Wheelchair Control Based on Event-Related Desynchronization/Synchronization and State Control", 2012, IEEE (Year: 2012).*

Machine translation of KR101465878B1 (Year: 2014).*

Kurth et al, "Real-Time Adaptive Color Correction in Dynamic Projection Mapping", 2020, IEEE (Year: 2020).*

Xie, Jun et al., "The Performance Evaluation of SSVEP-BCE Actuated Wheelchair with Parameter Setting of Time-Window Length and Stimulation Layout," (2020), Institute of Electrical and Electronics Engineers, pp. 581-585.

Müller, Sandraw Mara, Bastos, Teodiano Freire and Filho, Mario Sarcinelli, "Proposal of a SSVEP-BCI to Command a Robotic Wheelchair," J Control Autom Electr Sys, (2013) 24, pp. 97-105.

Mistry, Krupal Sureshbai, et al., "An SSVEP Based Brain Computer Interface System to Control Electric Wheelchairs," (2018), Institute of Electrical and Electronics Engineers, 6 pages.

* cited by examiner

MOBILITY DEVICE AND METHOD FOR CONTROLLING THE SAME

CROSS-REFERENCE TO RELATED APPLICATION

This application claims the benefit of priority to Korean Patent Application No. 10-2022-0047653, filed in the Korean Intellectual Property Office on Apr. 18, 2022, the entire contents of which are incorporated herein by reference.

TECHNICAL FIELD

The present disclosure relates to a mobility device controllable based on a visual stimulus and a method for controlling the same.

BACKGROUND

A Brain-Computer Interface (BCI) may be used to detect a brainwave (e.g., that may occur during a thinking process). The BCI may be configured to generate a signal corresponding to the brainwave (e.g., indicating the brainwave and/or one or more characteristics of the brainwave) to a signal corresponding to the brainwave. The signal corresponding to the brainwave may be delivered to a controller (e.g., of a mobility device). Then, the controller may then be able to execute a command corresponding to the brainwave (and/or the signal corresponding to the brainwave), which may be a command to control the mobility device (e.g., go straight, backward, change a direction, rotate, and/or stop).

Detect and/or identifying a brainwave and/or a signal indicating a brainwave may be difficult. Practical uses of BCI may require implementation, (e.g., in a system) with high performance and fast recognition speed, which may be difficult to achieve with data collection time required for model training (pre-training). Such a system should also be easily worn and used by a wide range of users.

A Steady-State Visual Evoked Potential (SSVEP) is a brainwave signal that may be generated due to repetitive visual stimulus (e.g., frequency stimulus). The SSVEP is a type of reactive BCI signal resulting from external stimulus. A BCI system using SSVEP may have high performance, fast recognition speed. In particular, SSVEP signals may be recognize with minimal or no training.

A BCI-based mobility device (or mobility device control system) using SSVEP may use an LED or LCD monitor for generating a visual stimulus to induce the SSVEP. The LED or LCD monitor may be placed close to a user's eye to induce a SSVEP signal. The user's vision may be obstructed, and it may be difficult for the user to get on or off the mobility device. In addition, the user's eyes may be exposed to the visual stimulus for a long time, which may cause visual fatigue and/or decrease SSVEP response to stimuli.

A wet brainwave measurement device (e.g., for measuring a SSVEP) may use a gel (e.g., ointment) to maximize contact between an electrode and a user (e.g., a user's scalp). A wet brainwave measurement may minimize noise (e.g., caused by hair, skin, and/or skull). A wet brainwave measurement may cause a user to want to wash his/her head after using the brainwave measurement device. Each time the brainwave measurement device is attached to the user, a position of the electrode should be designated. A dry brainwave measurement device for measuring the SSVEP may have lower performance in recognizing the SSVEP than that of the wet brainwave measurement device.

SUMMARY

The following summary presents a simplified summary of certain features. The summary is not an extensive overview and is not intended to identify key or critical elements.

Systems, apparatuses and methods are described for controlling a mobility device and/or another mobility device, using a visual stimulus. An apparatus may comprise the mobility device, a drive for driving the mobility device, a projector for outputting a visual stimulus, an electroencephalogram device for detecting a brainwave of a user and a controller. The controller may be configured to receive information from the electroencephalogram device, control the drive and cause the projector to output the visual stimulus at a distance from the mobility device.

A method may comprise causing, by a controller, a projector to output a visual stimulus to a surface spaced apart from the mobility device capable of moving a user by a specified distance. A signal indicating a brainwave induced based on the visual stimulus may be received from an electroencephalogram device. A control signal corresponding to the signal may be generated, and a drive of the mobility device may be controlled based on the control signal.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some examples of the present disclosure will be described in detail with reference to the drawings. In adding the reference numerals to the components of each drawing, it should be noted that the identical or equivalent component is designated by the identical numeral even when they are displayed on other drawings.

In describing the components of the example according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
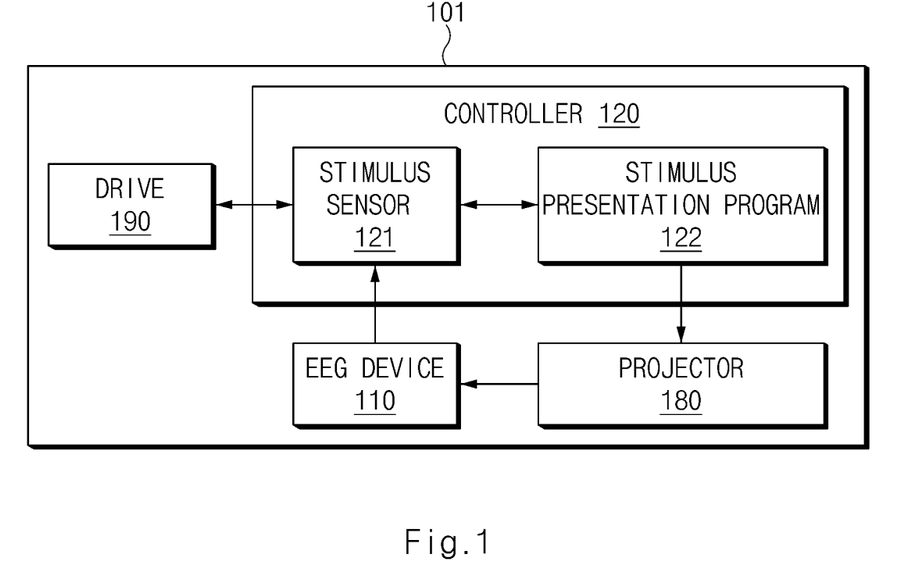
FIG. 1 is a block diagram of a mobility device that generates a projected visual stimulus according to an example of the present disclosure.

Referring to FIG. 1, a mobility device 101 may include an EEG device 110, a controller 120, a projector 180, and a drive 190 (e.g., including motor(s), and/or any other motion controller(s) to provide motion to, or change motion of, the mobility device, such as the mobility device 101, or a part thereof). While the mobility device 101 may be an electric powered wheelchair as shown in FIG. 1 or another device (e.g., a scooter, a car, a bike, the mobility device with treads, legs, etc.) configured to be controlled by a drive, such as the drive 190, could be used.

The EEG device 110 may be configured to be mounted on a user's head. The EEG device 110 may be configured to detect and/or measure SSVEP (Steady-State Visual Evoked Potential) of the user. The EEG device 110 may be configured to transmit an EEG signal corresponding to a detected and/or measured SSVEP to the controller 120 (e.g., in real time as detected and/or measured). The EEG device 110 may include a plurality of electrodes configured to be in contact with a user's scalp. The EEG device 110 may be configured to be in contact with the user's head in a wet or a dry manner. In particular, SSVEP provoked according to the present disclosure may be cause a high enough signal in the EEG device so as to be detected and/or measured when the contact with the user's head is a dry contact. The EEG device 110 may transmit the EEG signal to the controller 120 via wireless communication (e.g., Bluetooth communication), avoiding wires and increasing convenience and comfort for the user.

The EEG device 110 may be physically connected to and/or an integral part of the mobility device 101 (e.g., connected with physical a structure, such as a cord, a head-set, etc. However, the present disclosure is not limited thereto. For example, the EEG device 110 may be implemented separately from the mobility device 101. The EEG 110 may be configured to communicate the EEG signal with the mobility device 101 via wireless communication.

The controller 120 (e.g., a processor) may be configured to control the drive 190 based on (e.g., in response to) a signal received from the EEG device 110. Also, or alternatively, the controller 120 may be configured to control the projector 180 to output a visual stimulus (e.g., an image, such as a projected image). The controller 120 may comprise a stimulus sensor 121 and/or a stimulus presentation program 122.

The stimulus sensor (e.g. a BCI stimulus sensor of a BCI system) 121 may be configured to receive an EEG signal (e.g., a signal corresponding to a detected and/or measured SSVEP) from the EEG device 110. For example, the stimulus sensor 121 may be configured to receive the EEG signal from the EEG device 110 via a wireless communication (e.g., Bluetooth communication).

The controller 120 and/or a component thereof (e.g., the stimulus sensor 121) may be configured to generate a control signal for controlling the drive 190 based on a received EEG signal (e.g., based on an analyzed result of a received EEG signal indicating a SSVEP). The controller and/or component thereof may be configured to transmit the control signal corresponding to the EEG signal to the drive 190. For example, the stimulus sensor 121 may transmit a control signal, such as a go-straight signal, a turn-left signal, a turn-right signal and/or a stop signal to the drive 190. One or more control signals may be sent via serial communication for ease of signal interpretation. Also, or alternatively, the one or more control signals may be sent via parallel communication for speed purposes, and the driver may be configured to receive and interpret control signals sent via parallel communication.

The stimulus sensor 121 may be separate from the controller 120. For example, the stimulus sensor 121 may communicate with the controller 120 via wireless communication (e.g., Bluetooth). Also, or alternatively, a second controller may be configured to control the drive 190 (e.g., for safety). In this case, the drive 190 may be controlled, based on a user input (e.g., an input directly from a hand of the user) occurring at the controller 120 and/or the second controller (not shown).

The stimulus sensor 121 may be configured to transmit visual stimulus information to the stimulus presentation program 122 via a communication scheme (e.g., a configured communication scheme). The communication scheme may be a serial communication scheme. For example, the visual stimulus information may include information on start or end of a visual stimulus (e.g., instructions including a start time, an end time, and/or a time span for providing the visual stimulus).

The stimulus presentation program (e.g., projector controller) 122 may be configured to control the projector 180. The stimulus presentation program 122 may cause the projector 180 to start and/or end output of the visual stimulus. Further, the stimulus presentation program 122 may receive the visual stimulus information from the stimulus sensor 121. The stimulus presentation program 122 may transmit the visual stimulus to the projector 180 based on the received visual stimulus information. The stimulus presentation program 122 may transmit the visual stimulus image to the projector 180 via a communication scheme (e.g., in a parallel communication, such as over a High-Definition Multimedia Interface (HDMI)).

According to one example, the stimulus presentation program 122 may be implemented on a separate computing device from the stimulus sensor 121.

The projector 180 may be configured to project the visual stimulus according to the visual stimulus information received from the stimulus presentation program 122. The visual stimulus may be projected on a surface (e.g., a floor, ground, wall, etc.) at a position spaced by a specified distance from a front of the mobility device 101 (e.g., in a direction that the wheelchair 101 is configured to have a user face when seated therein). The visual stimulus may comprise direction indications, such as go-forward, turn-left, and turn-right indication. When a user gazes at one of the direction indication objects included in the visual stimulus for a duration greater than or equal to a specified time duration, a corresponding SSVEP may be generated by the user. The SSVEP generated by the user may be measured and/or detected via the EEG device 110.

According to an example, the direction indications (e.g., go-forward, turn-left, turn-right indication objects) may be projected to flicker (e.g., to vary in brightness) at one or more frequencies. Also, or alternatively, the direction indications may be projected to vary temporarily in color, pattern, focus, and/or some other visual manner. Different direction indications may be projected to flicker at different frequencies. For example, a turn-right indication may be output while flickering at 6 Hz, and the turn-left indication object may be output while flickering at 10 Hz.

The drive 190 may receive a control signal from the stimulus sensor 121 via the communication scheme (e.g., via a serial communication). The stimulus sensor 121 may generate the control signal to correspond to the user's apparent intention by analyzing the measured and/or detected EEG signal. The drive 190 may cause the mobility device 101 to move, stop, change speed and/or turn in response to the received control signal. The user may check a gazing result of the visual stimulus in feedback to an operation of the drive 190.

Figure 2A:
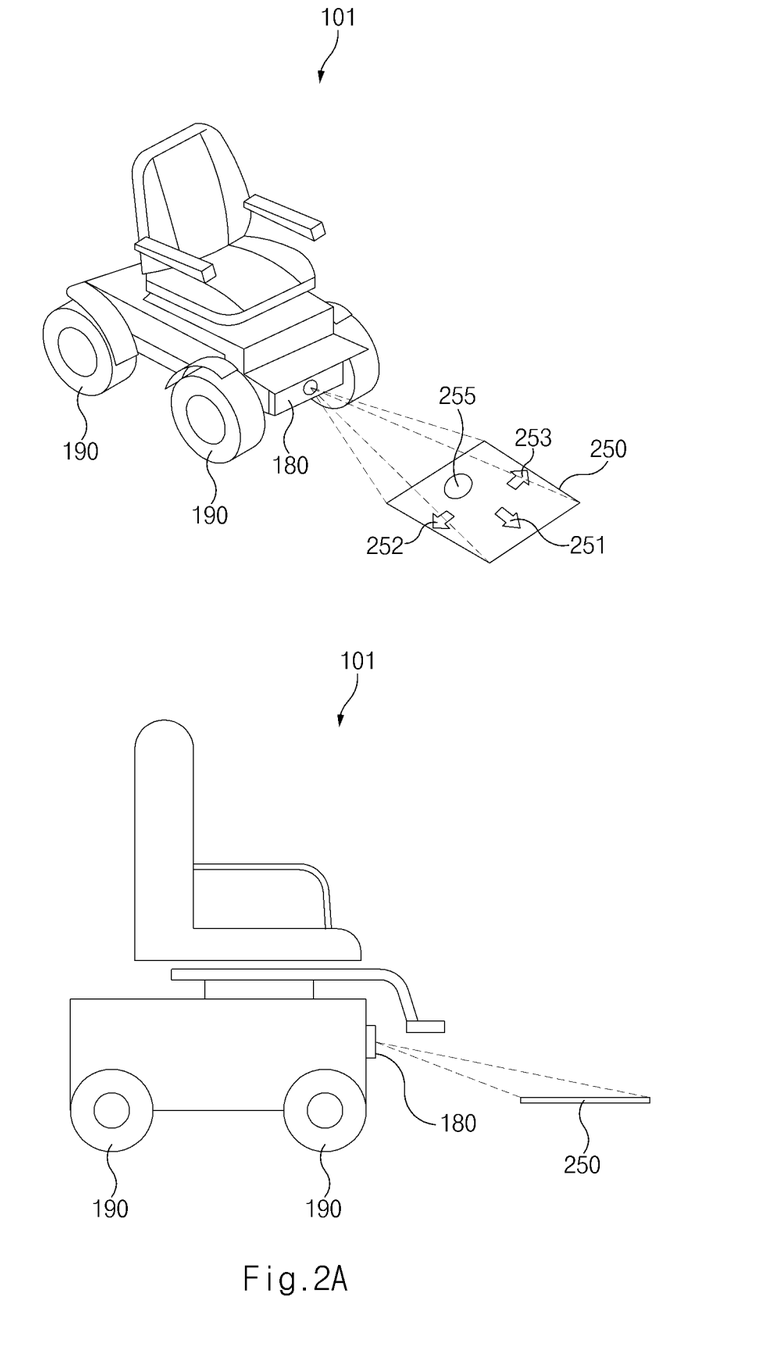
FIG. 2A is a mobility device comprising a projector for generating a projected visual stimulus according to various examples.

FIG. 2A shows the mobility device equipped with a projector for providing a projected visual stimulus according to various examples. FIG. 2A is illustrative. The present disclosure is not limited thereto.

Referring to FIG. 2A, the mobility device 101 may comprise the projector 180 to project a visual stimulus 250. A battery, a device, a circuit, and a board for an operation of the controller 120 may be installed on the mobility device 101, (e.g., internally, so as to not interfere with a user's comfort and/or take up additional space).

The visual stimulus 250 may be projected on the surface at a position spaced apart by a specified distance from the front of the mobility device 101. The visual stimulus 250 may comprise direction indications 251, 252, and/or 253 and/or a stop indication 255. The visual stimulus 250 may also, or alternatively, comprise other direction indications may also be included, such as directions indicating a reversed direction, directions between direction indications 251, 252, and/or 253, and/or other indications, such as speed indications, speed change indications, etc.

According to an example, the direction indication objects 251, 252, and/or 253 may be projected while flickering at different frequencies. For example, the turn-right indication 252 may be output while flickering at 6 Hz, and the turn-left indication object 253 may be output while flickering at 10 Hz.

According to one example, the object direction indications 251, 252, and/or 253 and/or the stop indication object 255 may be projected to have one or more a patterns and/or colors that may vary over time. For example, each of the direction indication objects 251, 252, and 253 may have patterns of dark and light areas that may be varied over time, such as reversed over time. For example, the patterns may comprise a checker board pattern, and black (e.g., dark) and white (e.g., light) of the checker board pattern may be alternated with each other over time.

The visual stimulus 250 may have a contrast ratio (e.g., 22,000:1) capable of increasing SSVEP stimulus. The smaller the distance of the projector 180 to the surface on which the visual stimulus 250 is projected, the brighter the visual stimulus 250, which may make the visual stimulus more easy to see, and thereby more likely to stimulate an SSVEP and/or stimulate a stronger SSVEP. However, the smaller the distance, the smaller a size of the visual stimulus 250, which may cause interference and/or difficulty distinguishing between indications. For this reason, the visual stimulus 250 may have the specified contrast ratio to solve a problem related to the smaller size of the visual stimulus and to prevent deterioration of SSVEP recognition performance due to the interference between and/or difficulty distinguishing between the indications.

Figure 4:
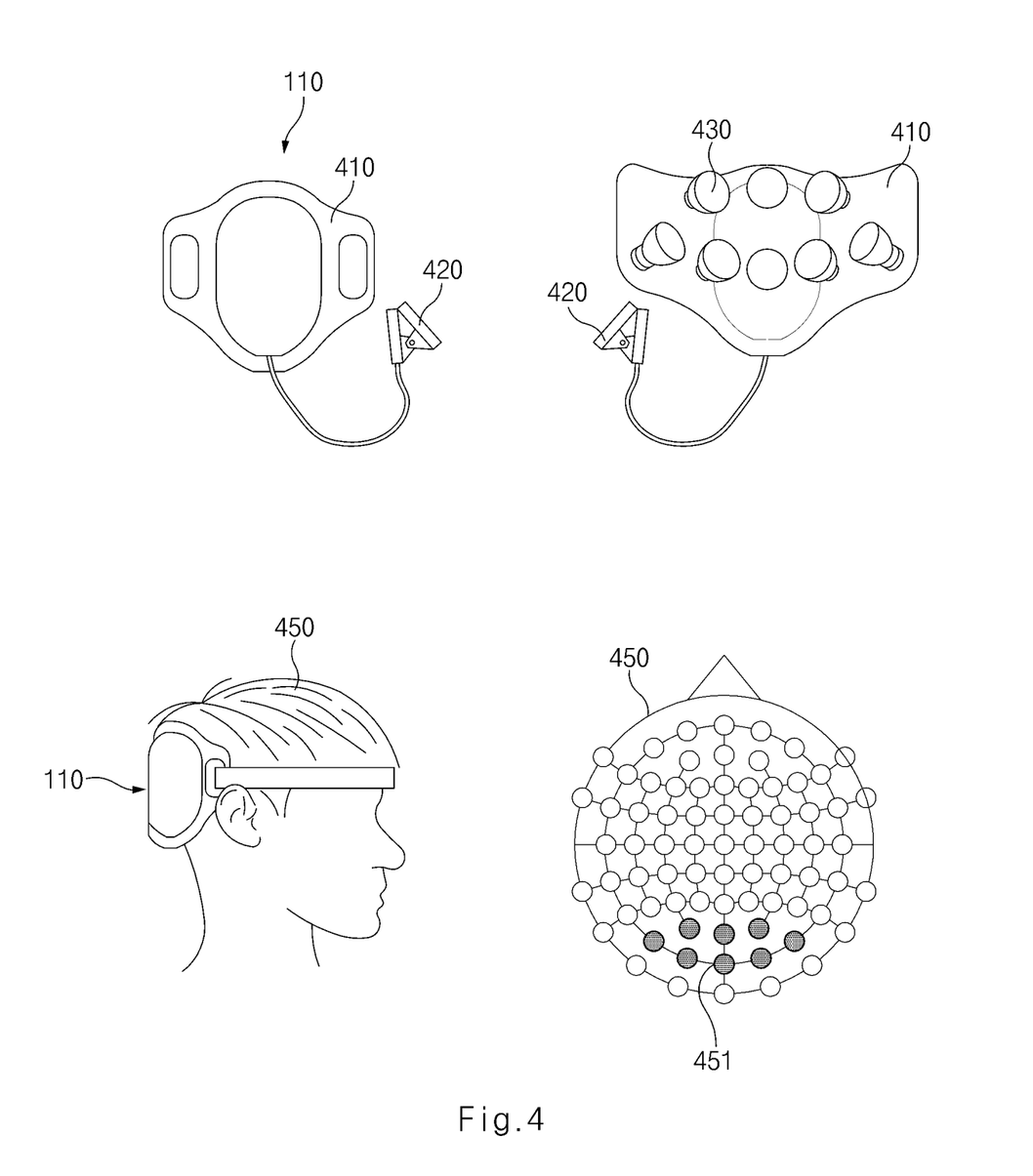
FIG. 4 is an electroencephalogram (EEG) device including a dry electrode according to various examples.

When a user gazes at one of the direction indications 251, 252, and/or 253 and/or the stop indication 255 comprised in the visual stimulus 250 for a specified time duration, e.g. 0.01 (s) to 30 (s) a corresponding SSVEP may be generated. The SSVEP may be measured through one or more electrodes of the EEG device 110 (FIG. 1 or FIG. 4). The one or more electrodes of the EEG device 110 may be in contact with and/or mounted on a user's head. The measured SSVEP may be used to generate a control signal to control the drive 190 of the mobility device 101.

For example, when a user gazes at the turn-right indication 252 for 2 seconds or more, a corresponding first SSVEP may be measured via the EEG device 110. The EEG device 110 may generate a corresponding first EEG signal and transmit the first EEG signal to the controller 120. The controller 120 may receive the first EEG signal from the EEG device 110. The controller 120 may compare a preset reference value to one or more characteristics (e.g., an amplitude, a frequency, a length, etc.) of the first EEG signal. The controller 120 may generate a first control signal to control the drive 190 to perform a turn-right movement, based on the comparing result (e.g., if one or more characteristics of the first EEG signal characteristic are consistent with the preset reference value). The controller 120 may transmit the first control signal to the drive 190. The drive 190 may receive the first control signal and, based on the received first control signal, cause the mobility device 101 to turn to the right.

In another example, when the user gazes at the turn-left indication object 253 for 2 seconds or more, a corresponding second SSVEP may be measured via the EEG device 110. The EEG device 110 may generate a corresponding second EEG signal and transmit the second EEG signal to the controller 120. The controller 120 may receive the second EEG signal from the EEG device 110. The controller 120 may compare a preset reference value and one or more characteristics of the second EEG signal with each other. The controller 120 may generate a second control signal to control the drive 190 to perform a turn-left movement, based on the comparing result. The controller 120 may transmit the second control signal to the drive 190. The drive 190 may receive the second control signal and, based on the received second control signal, cause the mobility device 101 to turn to the left.

The projector 180 may be mounted toward a lower portion (e.g., on a base) and/or towards a front portion (e.g., on a front face and/or in a direction corresponding to a direction a user seated on the mobility device 101 would substantially face) of the mobility device 101. The projector 180 may output the visual stimulus 250 towards a surface (e.g., a ground, a floor, etc.) at a position spaced by a specified distance from the front face of the mobility device 101. The projector 180 may be mounted thereon in a corresponding manner to various angles and distances. For example, the projector 180 may rotate about an axis of rotation or may slide via a mount.

The projector 180 may be configured to project light at least in part towards where a surface would be relative to the mobility device 101 during operation (e.g., towards a ground that the wheelchair 101 may be able to transport a user on during operation by a user for mobility). For example, a projector configured to outputs light at an angle may be mounted so that the angle points at least in part towards where a surface may be that the mobility device 101 may move on during operation. The angle may be adjustable, e.g., based on a detected distance and/or orientation of the surface. Thus, the visual stimulus 250 may be projected to a position spaced by a substantially constant distance from the front of the mobility device 101 via a small change in inclination, and the user's convenience in getting on and off the wheelchair and convenience of a footrest when getting on the wheelchair may be increased.

The visual stimulus 250 may be projected on the surface at the position spaced apart by a specified distance from the front face of the mobility device 101. For example, a horizontal (over the surface) distance from the visual stimulus 250 to the front of the mobility device 101 may be set to 130 cm. The user may comfortably gaze at the visual stimulus 250 on the bottom surface when the user uses the mobility device 101.

The projector 180 may be mounted such that an angle between the light output therefrom and the bottom surface has an inclination of a specified angle (e.g., 26 degrees). Conditions such as a projection distance and a projection angle of the projector 180 may be determined based on various factors such as a size of the visual stimulus 250, brightness of the light reflected from the surface, and the user's head position (e.g., in a sitting state on the mobility device 101) so that the SSVEP recognition performance may be at a maximal level.

The projector 180 may output light at a specified brightness and/or greater. For example, the projector 180 may output light at brightness equal to and/or greater than 3,700 ANSI lumens to achieve a bright and clear visual stimulus in a space with a lot of ambient light, for example. The brightness may be adjusted based on ambient light.

The projector 180 may be implemented as a short-throw projector configured to project on a large screen, and implemented to project at a relatively short distance.

The controller 120 may sense ambient illuminance and automatically adjust the output of the visual stimulus based on the ambient illuminance. Also, or alternatively, the controller 120 may adjust the brightness of the visual stimulus based on an angle at which the visual stimulus is output or a distance by which the visual stimulus is projected toward a position.

The controller 120 may detect a color and/or reflectivity of the surface around the mobility device 101. The controller may output the visual stimulus with a brightness, contrast, color hue and/or saturation to improve visibility on the surface. For example, the visual stimulus may be projected in a color contrasting with the color of the bottom surface.

Figure 2B:
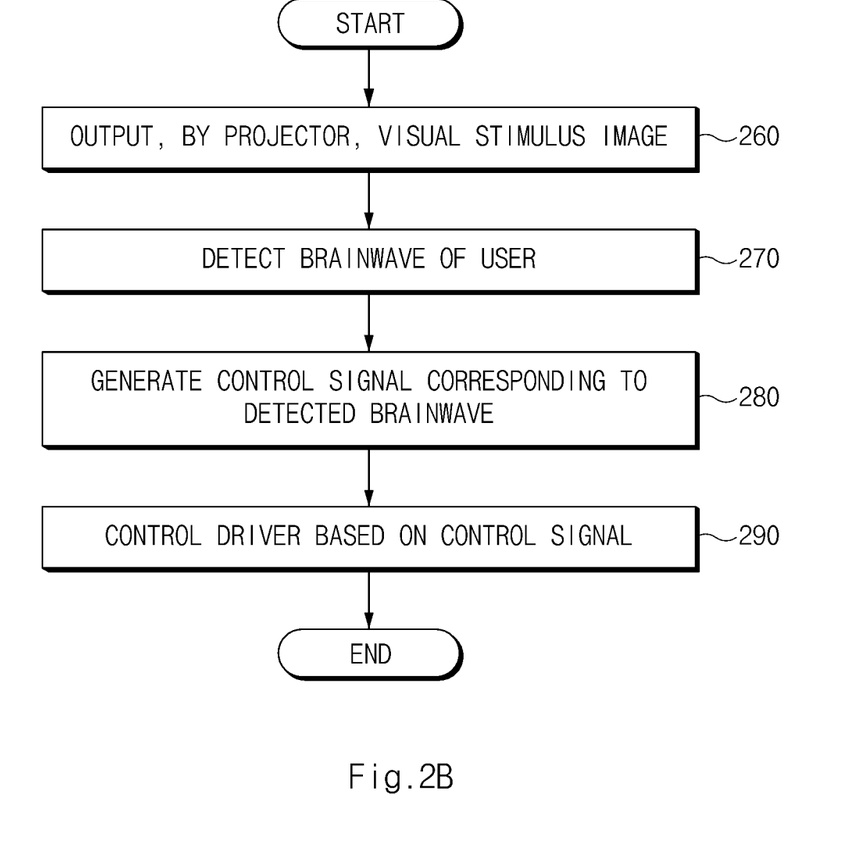
FIG. 2B shows a method for controlling a mobility device configured to generates a projected visual stimulus according to various examples.

Referring to FIG. 2B, in operation 260, the controller 120 may control the projector 180 to output the visual stimulus on a surface at a position spaced from the mobility device 101 by a specified distance. The visual stimulus may be displayed at a position spaced by a certain distance away from the user's eyes. Thus, the user's visual fatigue may be reduced.

The visual stimulus may comprise various objects (indications of direction, stop, speed change, etc.) for a variety of visual stimuli. Each of the visual stimulus objects may have a specified pattern (e.g., a checkerboard pattern). The visual stimulus object may change its pattern (e.g., reverse and/or flicker the pattern) over time. For example, the visual stimulus object could comprise a direction indication object such as a turn-left indication and a turn-right indication object or a stop indication object. The direction indication object or the stop indication object may have a checker board pattern, and a color of the checker board pattern may be reversed over time.

In operation 270, the controller 120 may control the EEG device 110 to detect the user's brainwave induced by the visual stimulus. The EEG device 110 may be mountable on the user's head, and may be configured to measure the brainwaves (e.g., measure and/or detect SSVEP) generated when the user gazes at the visual stimulus (e.g., for a threshold amount of time). The EEG device 110 may be worn on the user's head (e.g., in contact with the user's scalp. The EEG device 110 may operate in a gel-free and/or dry scheme.

In operation 280, the controller 120 may generate a control signal corresponding to the brainwave detected via the EEG device 110. The controller 120 may receive a signal (e.g., corresponding to the measured and/or detected SSVEP) corresponding to the brainwave detected via the EEG device 110. The controller 120 may generate the control signal corresponding to the EEG signal received from the EEG device 110. For example, the control signal may comprise a go-straight signal, a turn-left signal, a turn-right signal, or a stop signal.

In operation 290, the controller 120 may control the drive 190 based on the control signal. The controller 120 may transmit the generated control signal to the drive 190. The drive 190 may move, stop or turn the mobility device 101 in response to the received control signal.

The user may check the gazing result of the visual stimulus and may provide feedback (e.g., manual override and/or confirmation, and/or detect user feedback automatically, as discussed below) to the operation of the drive 190, and/or may control the movement of the mobility device 101.

According to an example, the controller 120 may be configured to detect a specified electromyography (EMG) signal. The controller 120 may end the movement of the mobility device 101. For example, the electromyography (EMG) signal may be generated based on a user's physical activity such as biting teeth or flickering eyes.

Figure 3:
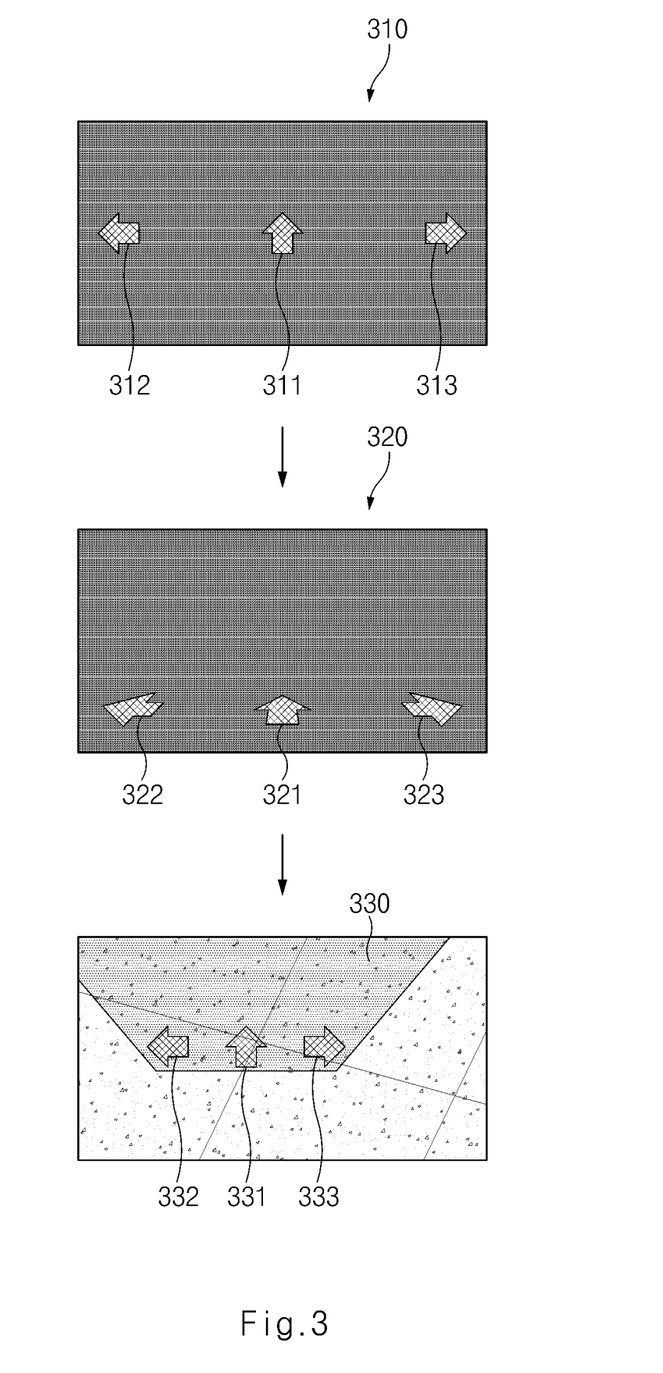
FIG. 3 shows modification of an image for outputting a visual stimulus image according to various examples.

FIG. 3 shows variations of a visual stimulus according to various examples. In FIG. 3, three direction indications are illustrated by way of example. However, the present disclosure is not limited thereto.

Referring to FIG. 3, a basic 310 may comprise direction indications 311, 312, and 313. In the basic 310, each of the direction indications 311, 312, and 313 may be in a form of an undistorted arrow. Each of the direction indications 311, 312, and 313 may have a checker board pattern. In the basic visual stimulus 310, the direction indications 311, 312, and 313 may be centered vertically in an area of the visual stimulus.

The direction indications 311, 312, and 313 may have different stimulus frequencies and/or operating frequencies. For example, the direction indication objects 311, 312, and 313 may have stimulus frequencies of 6 Hz, 6.7 Hz, and 7.5 Hz, respectively. The stimulus frequency may be changed to any other value, and/or may be selected to be different enough to be distinguishable to human perception and mutually non-harmonic.

The projector 180 may be mounted towards the lower end of the mobility device 101 in an inclined manner. As such, the projector may be configured to projects the basic visual stimulus 310 on a surface at an angle that may cause distortion of the basic visual stimulus 310 (e.g., a ratio of upper and lower ends of the basic visual stimulus 310 may be very large). This may make it difficult for a user to recognize the basic visual stimulus. The controller 120 may change the basic visual stimulus 310 to a modified visual stimulus 320 and transmit information indicating the modified visual stimulus 320 to the projector 180. The modified visual stimulus 320 may be modified to reduce the distortion of a perceived visual stimulus 330 or a direction and/or motion indication in the perceived visual stimulus 330.

The modified visual stimulus 320 may comprise direction indications 321, 322, and 323. Each of the direction indications 321, 322, and 323 may be in a form of a distorted arrow reflecting a projection environment (projection distance and projection angle). The direction indications 321, 322, and 323 may be positioned to minimize the distortion when projected and viewed by a user, and/or to minimize interference between the direction indications.

In the modified visual stimulus 320, the direction indications 321, 322, and 323 may be positioned in a lower area of the modified visual stimulus 320 in the vertical direction (relative to FIG. 3). Each of the direction indications 321, 322, and 323 may have a checker board pattern. The direction indications 321, 322, and 323 may have different stimulus frequencies and/or operating frequencies. For example, the direction indication objects 321, 322, and 333 may have stimulus frequencies of 6 Hz, 6.7 Hz, and 7.5 Hz, respectively. The stimulus frequencies may be changed to any other value, as discussed previously.

The modified visual stimulus 320 may be outputted from the projector 180 and may be displayed on the surface. Thus, the modified visual stimulus 320 displayed on the surface may appear as the perceived visual stimulus 330. The perceived visual stimulus 330 may comprise direction indications 331, 332, and 333. Each of the direction indications 331, 332, and 333 may be in a form of an arrow that is not distorted and/or has a smaller distortion than that of the modified visual stimulus 320. The direction indications 331, 332, and 333 may be disposed in the lower area of the perceived visual stimulus 330 in the vertical direction. In the perceived visual stimulus 330, a lower end of the perceived visual stimulus 330 may be brighter than an upper end of the due to the projection angle of the projector 180. The direction indication objects 331, 332, and 333 may be positioned in the lower area as the relatively brighter area of the perceived visual stimulus 330 to increase visibility thereof.

In the perceived visual stimulus 330, a form of each of the direction indications 331, 332, and 333 may be changed based on the projection angle and the projection distance of the projector 180. Each of the direction indications 331, 332, and 333 may be a checker board pattern. The direction indications 331, 332, and 333 may have different stimulus frequencies (or operating frequencies). For example, the direction indications 331, 332, and 333 may have stimulus frequencies of 6 Hz, 6.7 Hz, and 7.5 Hz, respectively. The stimulus frequency may be changed to another any value.

When the visual stimulus 330 is projected on the surface, the 330 may have brightness lower than that when an LCD or LED monitor is placed in front of the eyes of the user. Further, a distance between the stimulus-inducing and the user's eyes may be maintained to be greater than or equal to a certain distance, thereby reducing eye fatigue.

FIG. 4 is an EEG device comprising a dry electrode according to various examples. In FIG. 4, a case in which the EEG device 110 is implemented to have a dry electrode is illustrated by way of example. However, the present disclosure is not limited thereto. The EEG device 110 may be implemented to have a wet electrode.

Referring to FIG. 4, the EEG (electroencephalogram) device 110 may be configured to be mounted on a user's head. The EEG may be capable of measuring and/or detecting SSVEP. The SSVEP may be a neural response that occurs near an occipital lobe 451 due to a visual stimulus (e.g., a visual stimulus displayed with a specific frequency). The EEG device 110 may be a SSVEP dedicated measurement device, which may allow for reducing a number of unnecessary channels. This may make the EEG simple to operate and allow for reduced size, increasing wearability and comfort for a user. The EEG device 110 may be worn on a head 450 of a user, e.g., in a form of a band. For example, the EEG device 110 may select channels of PO3, POz, PO4, PO7, O1, Oz, O2, and PO8 and may measure SSVEP using the selected channels.

The EEG device 110 may comprise a body 410, a connector 420, and a plurality of electrodes 430.

The body 410 may be mountable on the head 450 of the user. The body 410 may be configured to be electrically connected to the controller 120 of the mobility device 101, e.g., via a connector 420 and/or via a wireless communication channel (e.g., a WiFi channel according to IEEE 802.11, wireless personal area network channel according to IEEE 802.15, Bluetooth, etc.). The body may be configured to establish a connection, via the wireless channel, with the controller 120 of the mobility device 101. The body 410 may receive signals from plurality of electrodes 430 in contact with the user's scalp on an inner surface of the body.

The connector 420 may be connected to the body of the mobility device 101, and may be electrically connected to the controller 120. The connector 420 may be configured to transmit an EEG signal corresponding to the measured SSVEP to the controller 120 in real time. When the EEG device 110 performs wireless communication with the controller 120, the connector 420 may be omitted and/or may not be connected to the body of the mobility device 101.

The plurality of electrodes 430 may be mounted on the inner surface of the body 410. The plurality of electrodes 430 may be mounted so as to be able to contact the user's scalp. When an SSVEP is generated in the head 450 of the user, the plurality of electrodes 430 may measure and/or detect an electrical signal corresponding to the SSVEP. The plurality of electrodes 430 may be in communicative contact with the occipital lobe 451 of the head 450 of the user in a dry scheme (in a gel-free a scheme). This may remove a time required for application of the gel to increase conductivity between the scalp and the electrode, and may reduce discomfort for the user after using the gel.

In FIG. 4, a case of using 8 electrodes in the vicinity of the occipital lobe 451 is illustrated by way of an example. However, the present disclosure is not limited thereto.

Figure 5:
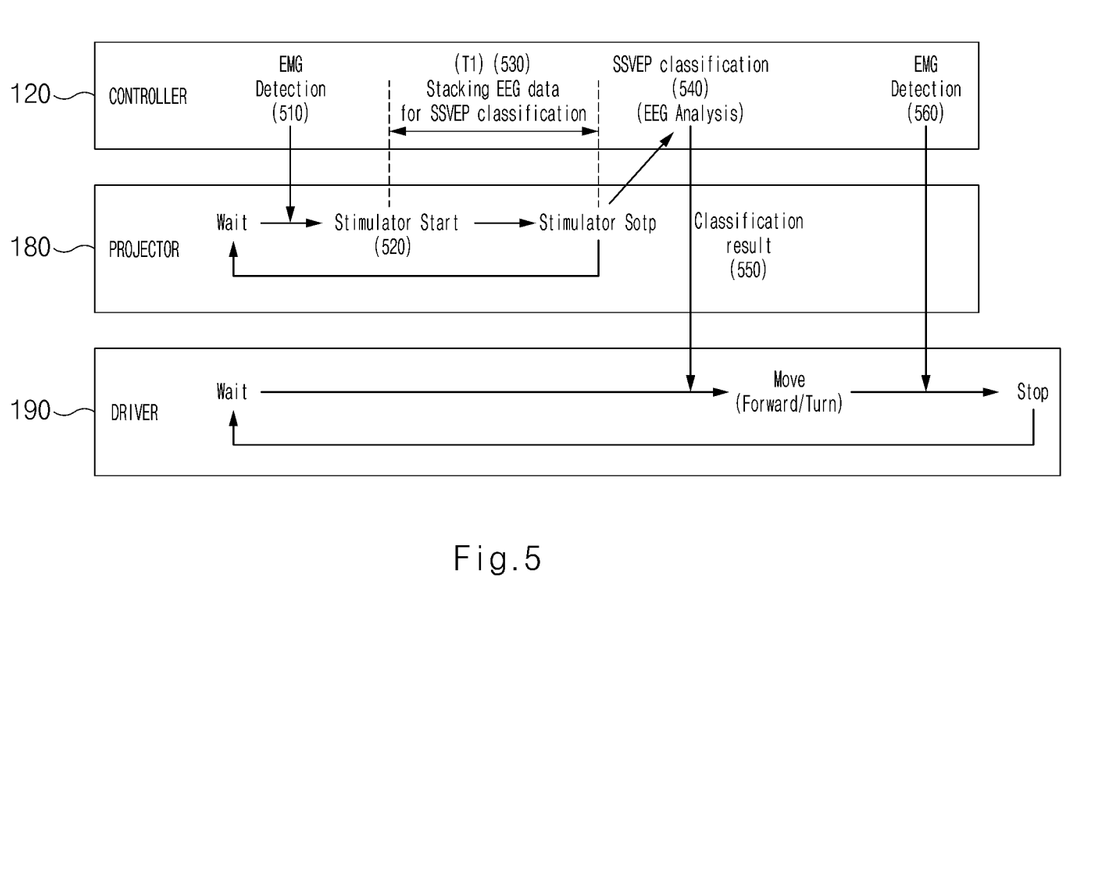
FIG. 5 is a signal flow diagram for control of a mobility device according to various examples.

Referring to FIG. 5, in operation 510, the controller 120 may detect the user's EMG signal. When the user starts to control the mobility device 101, an electromyography (EMG) signal may be generated from the user. For example, the electromyography (EMG) signal may be generated due to a physical activity, such as a tooth-biting motion or an eye flickering motion.

According to an example, the controller 120 may also, or alternatively, automatically start control of the mobility device 101 under a specified condition. For example, when the controller 120 detects that the user sits on mobility device 101, the controller 120 may start automatically the stimulation process. For example, the controller 120 may start the stimulation process automatically after a certain period of time (e.g., after 1 minute) after the detection of the user sitting on the mobility device 101.

In operation 520, when detecting the electromyography (EMG) signal, the controller 120 may cause the projector 180 to output the visual stimulus. Thus, a stimulation period T1 may be started.

In operation 530, the controller 120 may receive an EEG signal corresponding to the SSVEP from the EEG device 110 and classify the SSVEP during the stimulation period T1. The EEG signal received during the stimulation period T1 may not be transmitted to the drive 190 of the mobility device 101. During the stimulation period T1, when the visual stimulus is output, and the user gazes at a stimulus indicating a desired direction (and/or another desired action), a signal corresponding to the SSVEP may be generated. During the stimulation period T1, the controller may present the same stimulus for a certain period of time using a fixed time window technique, or may recognize the SSVEP stimulus for an optimal time at each control trial using an adaptive time window technique.

In operation 540, when the stimulation period T1 ends, the controller 120 may classify a direction-related intention of the user using a SSVEP recognition algorithm. The SSVEP recognition algorithm may be based on algorithms such as CCA, FBCCA, and EMSI. Such algorithms have the advantage of not requiring pre-training, which may enhance convenience and usability of BCI-based wheelchair control. The SSVEP recognition algorithm may employ an algorithm using deep learning techniques such as TRCA, CNN, and LSTM that requires training as needed, which may allow for increased accuracy and/or precision.

In operation 550, the controller 120 may transmit the control signal to the drive 190 based on the classification result. The controller 120 may control the operation of the mobility device 101 based on the control signal. For example, the control signal may comprise a go-straight signal, a turn-left signal, a turn-right signal, or a stop signal. A forward speed and a rotation speed may be changed, e.g., based on the user's control skill.

In operation 560, the controller 120 may detect the user's EMG signal. The controller 120 may terminate the movement of the mobility device 101 in response to the detected EMG signal. The user may generate a designated electromyography (EMG) signal to terminate the control of the mobility device 101. For example, the EMG signal may be generated based on a physical activity such as a tooth-biting motion or an eye flickering motion.

The mobility device 101 that outputs the projected visual stimulus using the projector 180 may have control performance of very high accuracy (e.g., 95% or greater). In this case, performance degradation caused by trade-offs due to the improvement of the convenience, such as performance degradation compared to the existing LCD monitor and performance degradation due to the use of the dry electrode compared to the existing wet electrode may be solved.

Figure 6:
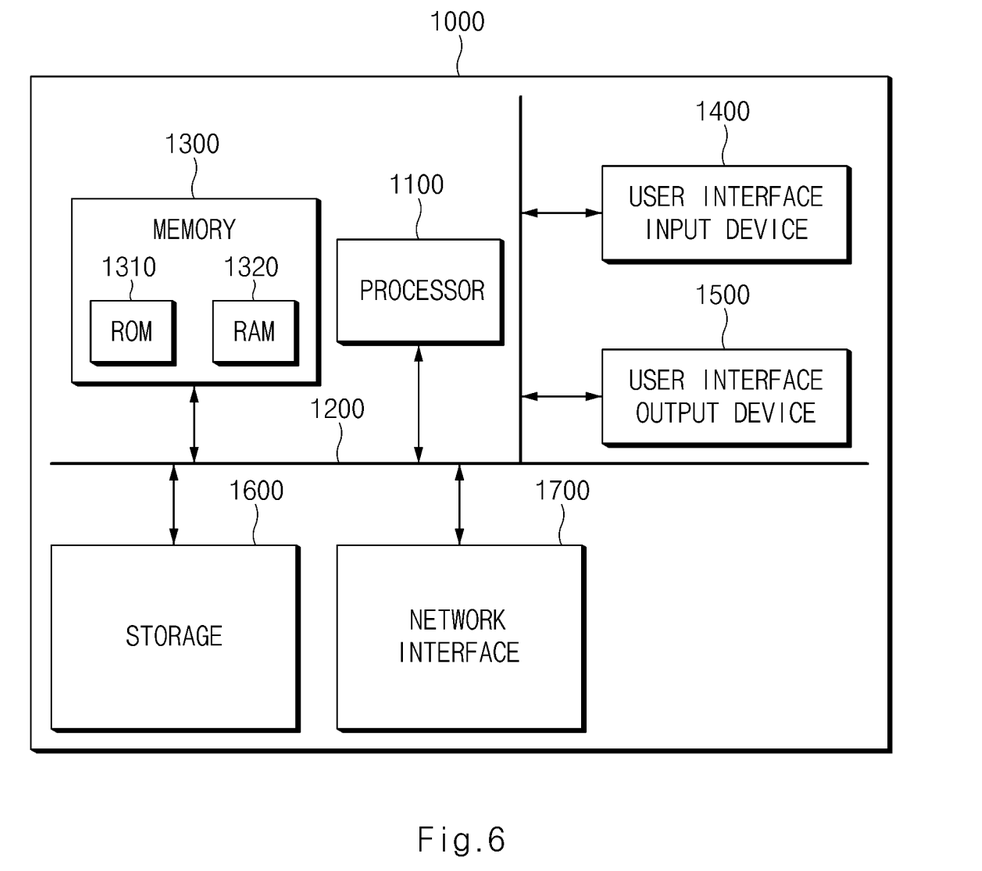
FIG. 6 shows a computing system according to an example of the present disclosure.

With reference to FIG. 6, a computing system 1000 may comprise at least one processor 1100, a memory 1300, a user interface input device 1400, a user interface output device 1500, storage 1600, and a network interface 1700 connected via a bus 1200.

The processor 1100 may be a central processing unit (CPU) and/or a semiconductor device that performs processing on commands stored in the memory 1300 and/or the storage 1600. The memory 1300 and/or the storage 1600 may comprise various types of volatile or non-volatile storage media. For example, the memory 1300 may comprise a ROM (Read Only Memory) and/or a RAM (Random Access Memory).

Thus, the operations of the method or the algorithm described in connection with the examples disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and/or a CD-ROM. The storage medium may be coupled to the processor 1100, which may read information from, and/or write information to, the storage medium. The storage medium may be integral with the processor 1100. The processor 1100 and/or the storage medium may reside within an application specific integrated circuit (ASIC). The ASIC may reside within the user terminal. Also, or alternatively, the processor and/or the storage medium may reside as individual components in the user terminal.

The description above is merely illustrative of the present disclosure, and various modifications and changes may be made by those skilled in the art without departing from the essential characteristics of the present disclosure.

Therefore, the examples disclosed in the present disclosure are not intended to limit the technical idea of the present disclosure but to illustrate the present disclosure, and the scope of the technical idea of the present disclosure is not limited by the examples. The scope of the present disclosure should be construed as being covered by the scope of the appended claims, and all technical ideas falling within the scope of the claims should be construed as being comprised in the scope of the present disclosure.

The present scheme may generate SSVEP using a projected visual stimulus to effectively control the mobility device.

The present scheme may generate a visual stimulus using light, which may be reflected back towards the mobility device from a long distance. Thus, the user's visual fatigue may be reduced, and performance of recognizing the SSVEP may be improved.

The present scheme may effectively control the mobility device while securing the user's front view using the projected visual stimulus. In addition, according to the present scheme, a device (or a projector) that generates the projected visual stimulus may be installed at a lower end of the mobility device, thereby improving convenience at which the user gets on or off the wheelchair.

The present scheme uses a dry electrode and a wearable SSVEP measurement device in a form of a band, so that a user may quickly wear the device.

The present scheme may provide a BCI-based mobility device which does not require pre-training and has high performance and fast recognition speed, and a method for controlling the same.

In addition to the above effects, various effects that are directly or indirectly identified based on the present disclosure may be provided.

An aspect of the present disclosure provides the mobility device and a method for controlling the same in which a projected visual stimulus is generated to induce SSVEP, and a dry electrode is used.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, the mobility device comprises a drive for driving the mobility device, a projector for outputting a visual stimulus image, an EEG (electroencephalogram) device for detecting a designated brainwave of a user, and a controller which controls the drive and the projector, and is electrically connected to the EEG device, wherein the controller controls the projector to output the visual stimulus image to a surface at a position spaced by a specified distance from the mobility device.

In one implementation of the wheelchair, the EEG device may establish a communication channel with the controller in a designated wireless communication scheme, wherein the EEG device may transmit a signal corresponding to the brainwave to the controller via the communication channel.

In one implementation of the wheelchair, the EEG device may be mounted on a head of the user in a dry manner and generates an electrical signal corresponding to the brainwave.

In one implementation of the wheelchair, the visual stimulus image may comprise a plurality of objects related to movement of the mobility device.

In one implementation of the wheelchair, the plurality of objects may be output at different frequencies.

In one implementation of the wheelchair, each of the plurality of objects may have a checkerboard pattern.

In one implementation of the wheelchair, the plurality of objects may be positioned in a lower area in a vertical direction of the visual stimulus image.

In one implementation of the wheelchair, the projector may be mounted at a lower end of the mobility device.

In one implementation of the wheelchair, the controller may control the projector to output the visual stimulus image based on detecting an electromyography signal.

In one implementation of the wheelchair, the controller may control the projector to output the visual stimulus image and suspend control of the drive for a specified time duration.

In one implementation of the wheelchair, the brainwave may comprise a steady-state visual evoked potential (SSVEP).

In one implementation of the wheelchair, the controller may detect ambient light, and adjust brightness of the visual stimulus image based on the ambient light.

In one implementation of the wheelchair, the controller may adjust brightness of the visual stimulus image, based on an angle at which the visual stimulus image may be output or a distance by which the visual stimulus image may be projected at a position.

In one implementation of the wheelchair, the projector may output the visual stimulus image at brightness greater than or equal to a specified brightness level.

In one implementation of the wheelchair, the controller may detect a color of a bottom surface around the mobility device, and control the projector to output the visual stimulus image in a color contrasting with the color of the bottom face.

In one implementation of the wheelchair, the controller may end movement of the mobility device based on detecting a designated electromyography signal.

According to another aspect of the present disclosure, a method for controlling the mobility device comprises outputting, by a projector of the mobility device, a visual stimulus image to a surface spaced apart from the mobility device by a specified distance, detecting, by an EEG (electroencephalogram) device of the mobility device, a designated brainwave of a user induced based on the visual stimulus image, generating a control signal corresponding to the brainwave, and controlling a drive of the mobility device, based on the control signal.

In one implementation of the method, the EEG device may be mounted on a head of the user in a dry manner and generates an electrical signal corresponding to the brainwave.

In one implementation of the method, the visual stimulus image may comprise a plurality of objects related to movement of the mobility device.

In one implementation of the method, the plurality of objects may be output at different frequencies.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
    an electric wheelchair;
    a drive for driving the electric wheelchair;
    a projector for outputting a visual stimulus;
    an electroencephalogram (EEG) device for detecting a brainwave of a user; and
    a controller configured to:
        receive information from the EEG device;
        control the drive;
        detect an electromyography (EMG) signal generated from the user in a waiting state; and
        cause the projector to output the visual stimulus at a distance from the electric wheelchair based on detecting the EMG signal.

2. The apparatus of claim 1, wherein the EEG device is configured to:
    establish a communication channel with the controller in a designated wireless communication scheme; and
    transmit a signal corresponding to the brainwave to the controller via the communication channel.

3. The apparatus of claim 1, wherein the EEG device is configured for mounting on a head of the user in a dry manner and generating an electrical signal corresponding to the brainwave.

4. The apparatus of claim 1, wherein the visual stimulus comprises a plurality of objects related to movement of the apparatus.

5. The apparatus of claim 4, wherein the plurality of objects are output at different frequencies.

6. The apparatus of claim 4, wherein each of the plurality of objects has a checkerboard pattern.

7. The apparatus of claim 4, wherein the plurality of objects are positioned in a lower area in a vertical direction of the visual stimulus.

8. The apparatus of claim 1, wherein the projector is mounted at a base of the electric wheelchair.

9. The apparatus of claim 1, wherein the controller is configured to control the projector to output the visual stimulus and to suspend control of the drive for a specified time duration.

10. The apparatus of claim 1, wherein the brainwave includes a steady-state visual evoked potential (SSVEP).

11. The apparatus of claim 1, wherein the controller is configured to:
    detect ambient light; and
    adjust brightness of the visual stimulus based on the ambient light.

12. The apparatus of claim 1, wherein the controller is configured to adjust brightness of the visual stimulus, based on an angle at which the visual stimulus is output or a distance by which the visual stimulus is projected at a position.

13. The apparatus of claim 1, wherein the projector is configured to output the visual stimulus at brightness greater than or equal to a specified brightness level.

14. The apparatus of claim 1, wherein the controller is configured to:
    detect a color of a surface around the electric wheelchair; and control the projector to output the visual stimulus in a color contrasting with the color of the surface.

15. The apparatus of claim 1, wherein the controller is configured to end movement of the electric wheelchair based on detecting a designated EMG signal.

16. A method comprising:
- detecting, by a controller, an electromyography (EMG) signal generated from a user in a waiting state;
- causing, by the controller, a projector to output a visual stimulus to a surface spaced apart from an electric wheelchair by a specified distance based on the detecting the EMG signal;
- receiving, from an electroencephalogram (EEG) device, a signal indicating a brainwave induced based on the visual stimulus;
- generating a control signal corresponding to the signal; and
- controlling a drive of the electric wheelchair based on the control signal.

17. The method of claim 16, wherein the receiving the signal comprises receiving a signal indicating an electrical signal generated by the EEG device in response to the brainwave detected via dry contact of one or more electrodes of the EEG device with a user's head.

18. The method of claim 16, wherein the visual stimulus comprises a plurality of indications of possible actions of the electric wheelchair.

19. The method of claim 18, wherein the plurality of indications are output at different frequencies.

\* \* \* \* \*